United States Patent
Hoffmann et al.

(10) Patent No.: US 6,755,573 B2
(45) Date of Patent: Jun. 29, 2004

(54) FULL MESH OPTICAL INTERCONNECT

(76) Inventors: Martin Hoffmann, 20 Hawley Rd., Shelton, CT (US) 06484; William Telesco, 148 Babbling Brook Rd., Torrington, CT (US) 06790

(*) Notice: Subject to any disclaimer, the term of this patent is extended or adjusted under 35 U.S.C. 154(b) by 130 days.

(21) Appl. No.: 09/771,797

(22) Filed: Jan. 29, 2001

(65) Prior Publication Data

US 2002/0102062 A1 Aug. 1, 2002

(51) Int. Cl.[7] ............ G02B 6/36; G02B 6/12; G02B 6/26; G02B 6/42
(52) U.S. Cl. ............ 385/53; 385/14; 385/15
(58) Field of Search ............ 385/53, 14, 15, 385/42, 46

(56) References Cited

U.S. PATENT DOCUMENTS

| | | | | |
|---|---|---|---|---|
| 4,943,136 A | * | 7/1990 | Popoff | 385/46 |
| 5,009,477 A | * | 4/1991 | Alferness et al. | 385/17 |
| 5,995,262 A | * | 11/1999 | Hirota et al. | 398/164 |
| 2002/0021885 A1 | * | 2/2002 | Kim | 385/15 |

* cited by examiner

*Primary Examiner*—Chandrika Prasad

(57) ABSTRACT

The present invention comprises a full mesh optical backplane with power distribution conductors. The backplane provides a set of power distribution conductors and a plurality of dedicated, optically isolated transmission guides such that each circuit board assembly within a system can directly transmit optically isolated data to any and all other circuit boards using dedicated, individual transmission means within the system and such that each circuit board assembly is provided with power from a centralized source.

4 Claims, 11 Drawing Sheets

| CARDGUIDE STATION | a | b | c | d | e | f | g | h |
|---|---|---|---|---|---|---|---|---|
| a | N/A | LAYER h' | LAYER d' | LAYER e' | LAYER a' | LAYER f' | LAYER b' | LAYER g' |
| b | LAYER h' | N/A | LAYER e' | LAYER a' | LAYER f' | LAYER b' | LAYER g' | LAYER c' |
| c | LAYER d' | LAYER e' | N/A | LAYER f | LAYER b' | LAYER g' | LAYER c' | LAYER h' |
| d | LAYER e' | LAYER a' | LAYER f | N/A | LAYER g' | LAYER c' | LAYER h' | LAYER d' |
| e | LAYER a' | LAYER f | LAYER b' | LAYER g' | N/A | LAYER h' | LAYER d' | LAYER e' |
| f | LAYER f | LAYER b' | LAYER g' | LAYER c' | LAYER h' | N/A | LAYER e' | LAYER a' |
| g | LAYER b' | LAYER g' | LAYER c' | LAYER h' | LAYER d' | LAYER e' | N/A | LAYER f |
| h | LAYER g' | LAYER c' | LAYER h' | LAYER d' | LAYER e' | LAYER a' | LAYER f | N/A |

Figure 3

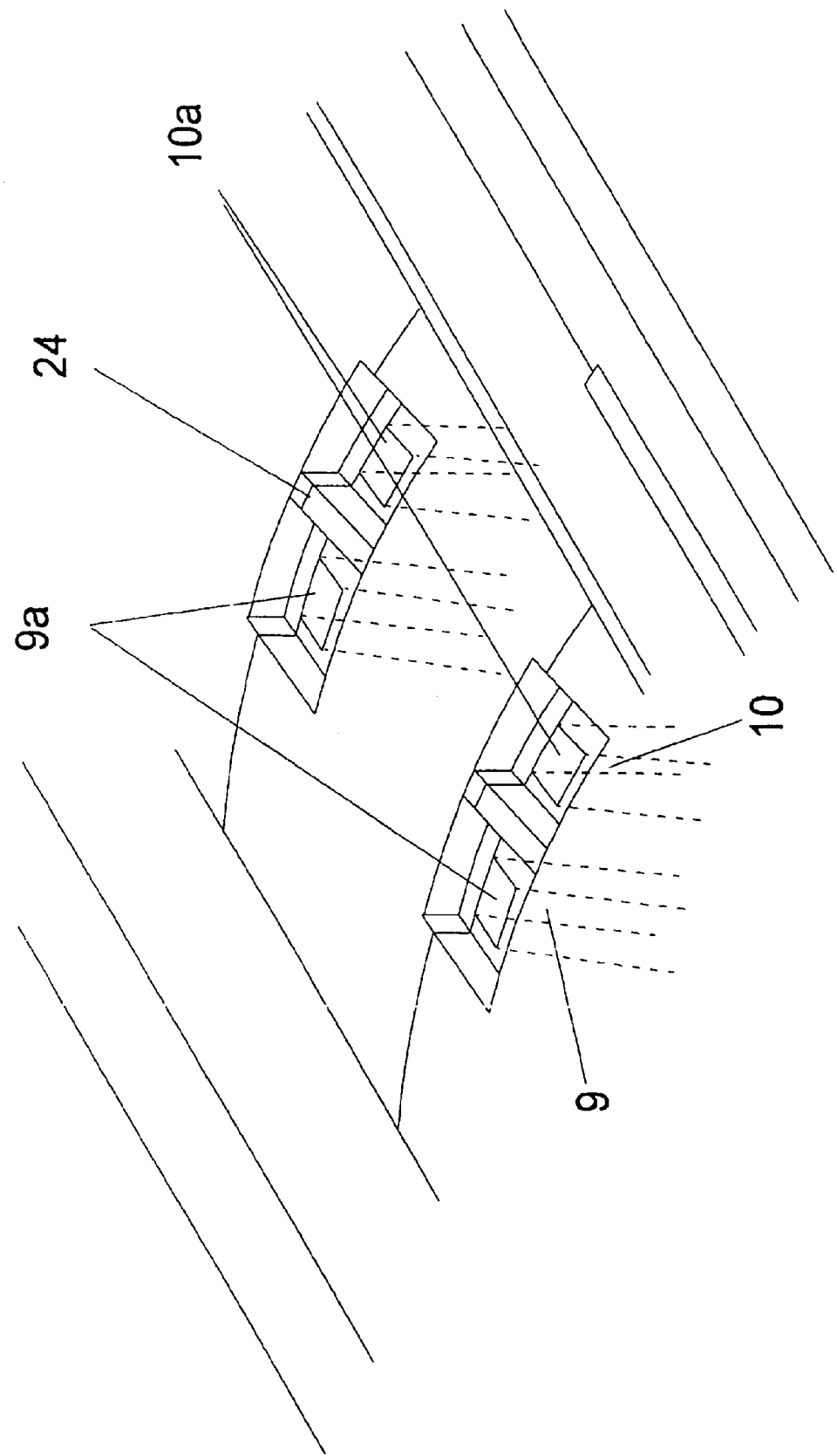

FULL MESH OPTICAL INTERCONNECT

BACKGROUND OF THE INVENTION

The present invention relates to full mesh optical interconnects including optical midplanes and backplanes for interconnecting electronic systems particularly communications systems. The optical interconnect provides dedicated high bandwidth connections between each circuit board assembly and every other circuit board assembly within a given electronics system.

Communication systems, especially those developed for scaleable high bandwidth systems, require interconnects more particularly referred to herein as backplanes in order to interconnect circuit board assemblies comprising the system. Backplanes are the ordinary means of providing such interconnection. In practice, ordinary electrical backplanes normally require a multitude of electrical connections for each circuit board in the system, thus reducing the reliability of the system. Additionally, each circuit board in the system must share the communications paths on electrical backplanes so that only a fraction of the overall bandwidth is available to each circuit board. Furthermore the sharing of resources is detrimental to system reliability in that a failure on one circuit board assembly is likely reduce the utility of the shared paths for all circuit boards. In communications systems where redundant subsystems are more commonly used, ordinary backplanes provide redundancy only at great expense. Finally, electrical backplanes are well known to be a source of electromagnetic emissions and crosstalk whereas an optical transmission guide emits no measurable radiation in the RF spectrum and there is no capacitive or magnetic coupling.

Other optical interconnection systems have been devised, however most are either costly systems that comprise a number of expensive optical elements like embedded fiber-optic cable and related connectors, mirrors, turning mirrors, holographic elements, graded index materials or lenses. The prior art also contains a few examples of inventions that attempt to provide the necessary function of perpendicular routings of signals from one circuit board assembly to the next but do so by utilizing unproven, undefined or costly manufacturing processes or require fundamental changes to the construction of the associated printed circuit board assemblies. In yet other inventions, optical interconnection methods rely on a line of sight connection, the bonding of fiber-optic cables to integrated circuit waveguides or connections on a single printed circuit board assembly. In the case of electrical backplanes and more than one optical interconnect invention, broadcast systems are typically employed that share the utility of the provided communications path. Broadcast systems create contention for resources as well as interference between communication channels.

Another common problem with backplane and midplane designs is the notion of upgradeability. Backplanes have been historically designed so as not to contain any active components since they represent a single point of failure for the system that employs them. This is true of the present invention which provides interconnects without active components.

The present invention also provides a simple means to upgrade the capacity of a given backplane in the field simply by attaching additional waveguide plates to the backplane which are available to serve new circuit board assemblies added to the system while existing circuit board assemblies continue to perform their functions. This is another important quality of the present invention since it can be used to prevent the need for what is known in the art as a forklift upgrade.

So, there is a need for an alternative to electrical backplanes capable of providing inexpensive scaleable bandwidth, reliable operation, a minimum of electrical connections, dedicated communications paths, reduced electromagnetic emissions and has the ability to be upgraded in the field.

The present invention provides a full mesh optical interconnect in which each circuit board assembly is assigned a dedicated optical transmission path to every other circuit board assembly in a communications system. The only electrical connections necessary for each circuit board assembly are electrical power connections.

SUMMARY OF THE INVENTION

The present invention provides a full mesh optical backplane having power transmission conductors and a set of optical transmission guides for accommodating a set of circuit board assemblies forming part of an electronic system. Each circuit board assembly is provided with electrical power through power transmission conductors from a centralized source. The optical transmission guides enable direct transmission of data from each circuit board assembly within a system to any and all other circuit boards within the system.

In a preferred embodiment of the invention, individual plates or discs embody optical transmission guides with an assembly or stack of the discs comprising a backplane. The stack of discs is bound together by means of metallic conductors that also provide a means for power transmission. Circuit board assemblies in a system are connected to the backplane in such manner that each circuit board receives power from metallic conductors, and communicates through dedicated optical transmission guides with every other circuit board assembly in the system. Full mesh is the operating condition in which each circuit board assembly communicates over dedicated paths with every other circuit board assembly in a system.

In specific embodiments a plurality of circuit board assemblies and a plurality of optical transmission guides are required. For the simple case of one circuit board, no transmission guides are required. For two circuit board assemblies, two transmission guides are required: one to transmit from the first assembly to the second assembly, and one to transmit from the second assembly to the first assembly. For simplicity, the number of transmission guides can be divided by two to account for the generalized requirement for bi-directional transmission. Thus for example, in a system comprising eight circuit board assemblies, twenty-eight transmission guide pairs are required and each circuit board assembly would be connected to seven transmission guide pairs so that it could communicate directly with each of its circuit board neighbors.

In a preferred embodiment of the invention, each circuit board assembly in the system has a plurality of optical interfaces arranged along an edge of the circuit board, with each optical interface comprising both a transmitter and a receiver. In addition, each circuit board assembly in the system has a plurality of electrical contacts along the same edge to obtain the required electrical power to perform its function. A plurality of electrical contacts are provided to enhance the reliability of the power distribution means.

The present invention provides a full mesh optical interconnect in several embodiments without expensive optical elements, resorting to unproven or costly manufacturing processes, fundamental changes to the construction of related circuit board assemblies, line of sight optical connections, bonding fiber-optic cables to integrated circuit waveguides, or strictly limiting upgrades to forklift upgrades.

Specific examples are included in the following description for purposes of clarity, but various details can be changed within the scope of the present invention.

OBJECTS OF THE INVENTION

An object of the invention is to provide a full mesh optical interconnect for electronic systems enabling high bandwidth dedicated connections between each circuit board assembly and every other circuit board assembly in the system.

Another object of the invention is to provide optical interconnects having optical transmission guides with each guide being in optical isolation from all optical guides in the backplane.

Another object of the invention is to provide optical interconnects having scaleable means for increasing mesh size as the number of circuit boards is increased thereby adding dedicated pairs of optical transmission guides between circuit boards.

Another object of the invention is to improve reliability of electronic systems.

Another object of the invention is to reduce the number of electrical connections required for each circuit board in the system.

Another object of the invention is to reduce electromagnetic emissions of communications systems.

An object of the invention is to provide a full mesh optical backplane enabling dedicated connections between each circuit board assembly and every other circuit board assembly in the system in an economical manner.

Another object of the invention is to provide mating structures for optical waveguides that allow for abutment of an additional set of waveguides for extending an optical path directly to a circuit board assembly.

Another object of the invention is to minimize length of optical paths and thereby minimize transmission delay in optical signals.

Another object of the invention is to provide electrical isolation of the circuit board assemblies in a system.

Another object of the invention is to minimize surface area of optical interconnects such as backplanes thereby to minimize air flow restrictions and improve heat dissipation.

Other and further objects of the invention will become apparent with an understanding of the following detailed description of the invention or upon employment of the invention in practice.

DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which:

FIG. 3 is a table illustrating the assignment of optical transmission guides to the optical waveguide plates forming part of the optical backplane according to the invention.

FIG. 7 is an enlarged perspective view of the mating structures, i.e., electro-optical interface, of the optical backplane according to the invention.

DETAILED DESCRIPTION OF THE PREFERRED EMBODIMENT

Figure 1:
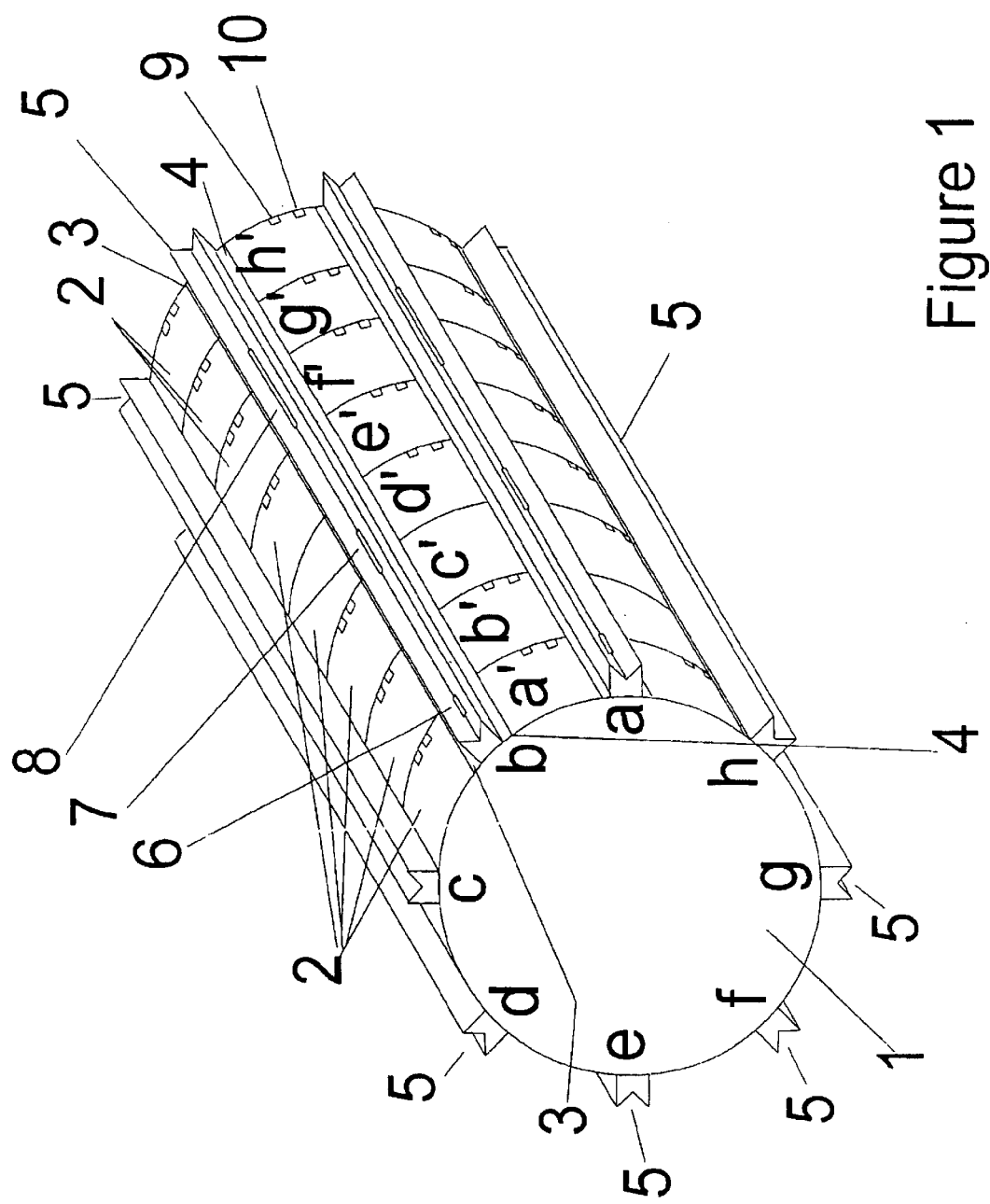
FIG. 1 is a perspective view of the preferred embodiment of a full mesh optical backplane according to the invention.
Figure 2:
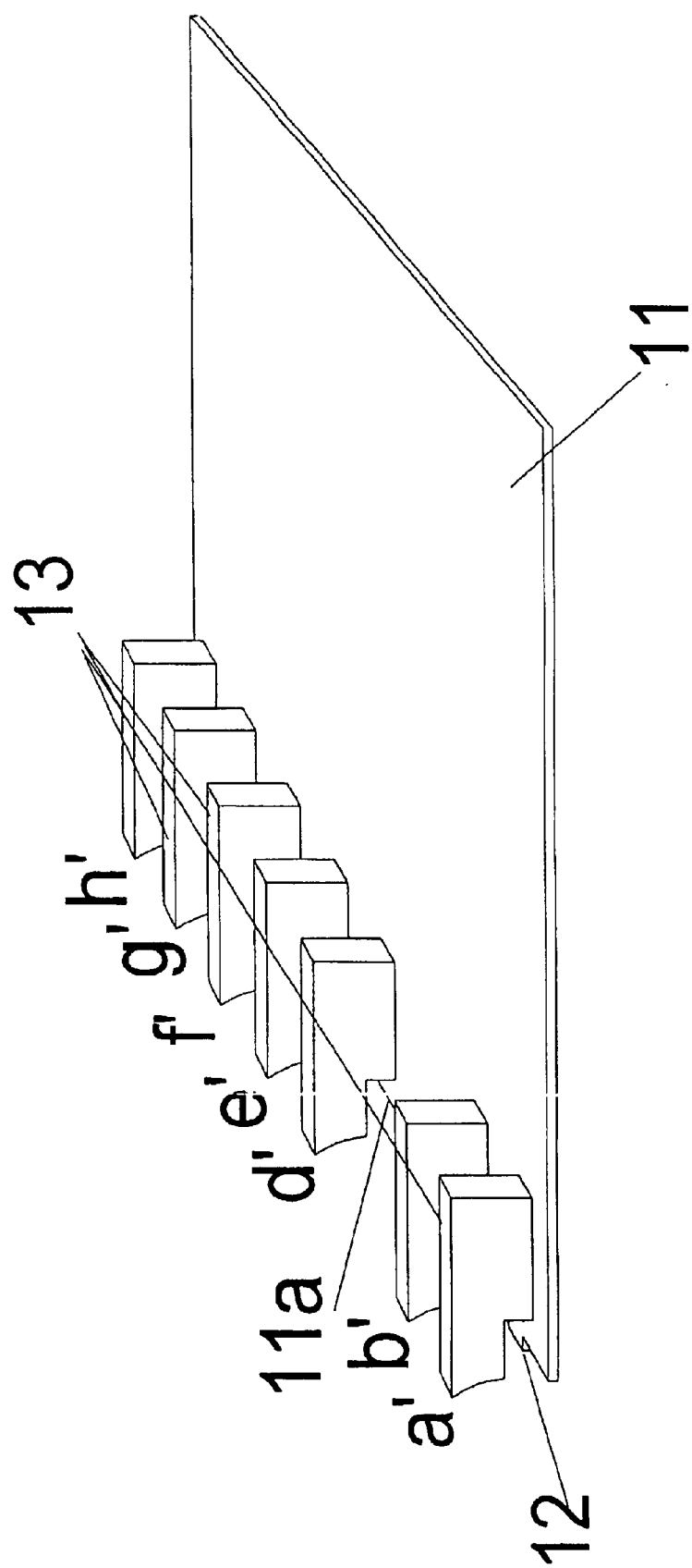
FIG. 2 is a perspective view of a circuit board assembly designed for use with the optical backplane of FIG. 1.

Referring to FIG. 1 of the drawing, a full mesh optical interconnect according to the invention in the form of backplane 1 comprises in general assembly a stack of eight optical wave guide plates 2, electrical power distribution means including a positive electrical power supply conductor 3 and a negative power supply conductor 4, a cardguide 5 with guide slots 6, 7 and 8 for mounting a circuit board assembly 11 (FIG. 2), and optical waveguide receiving ports 9 and optical waveguide transmitting ports 10 for registry with electro-optical interfaces 13 of FIG. 2. Power supply conductors 3 and 4 are provided for each cardguide 5 in preferred embodiment.

In preferred embodiment, the waveguide plates are cylindrical discs stacked end to end to form a backplane cylinder. As shown in FIG. 1, there are eight sets of power distribution means and cardguides arranged symmetrically along the outer surface of the backplane cylinder and parallel to the backplane cylinder axis. Eight circuit boards are fitted to the cardguides with electro-optical interfaces 13 in optical registry with optical waveguide receiver ports 9 and optical waveguide transmitter ports 10 and with the circuit boards contacting the power distribution means. When so assembled, the circuit boards project radially from the backplane cylinder and those skilled in the art will recognize that a supporting frame (not shown) may easily be constructed about this circuit board assembly. The waveguide plates 2 in the stack are more particularly identified by letters a', b', c', d', e', f', g', and h'. The circuit board assembly card guides 5 are identified by letters a, b, c, d, e, f, g, and h. Letters a through h also identify the location of eight fixed stations equally spaced about the circumference of the optical backplane stack.

A circuit board assembly 11 designed for operation with the present invention is illustrated in FIG. 2 wherein the circuit board comprises seven electro-optical interfaces 13 in optical registry with optical waveguide receiver ports 9 and optical waveguide transmitter ports 10, and alignment tabs 12 to mate with cardguide slots 6, 7, and 8. The illustrated circuit board assembly is shown as it would be used in circuit board cardguide station a. The electro-optical interfaces 13 are marked letters a', b' and d'–h' to indicate registry with plates a', b' and d'–h' of the backplane. Those skilled in the art will recognize that additional surface area is required on the circuit board assembly 11 to provide space for active circuitry and that multiple power contacts can be placed along the edge 11a containing the electro-optical interfaces 13 to provide for reliable power distribution.

It is to be understood that each circuit board assembly 11 is electrically isolated from all other circuit board assemblies in the system, except for common power connector, it being understood in the art that such power connector can also be electrically isolated.

Those skilled in the art will recognize that the surface area of the backplanes is minimized and less restrictive of air flow thereby to maximize air cooling of the system.

Figure 4:
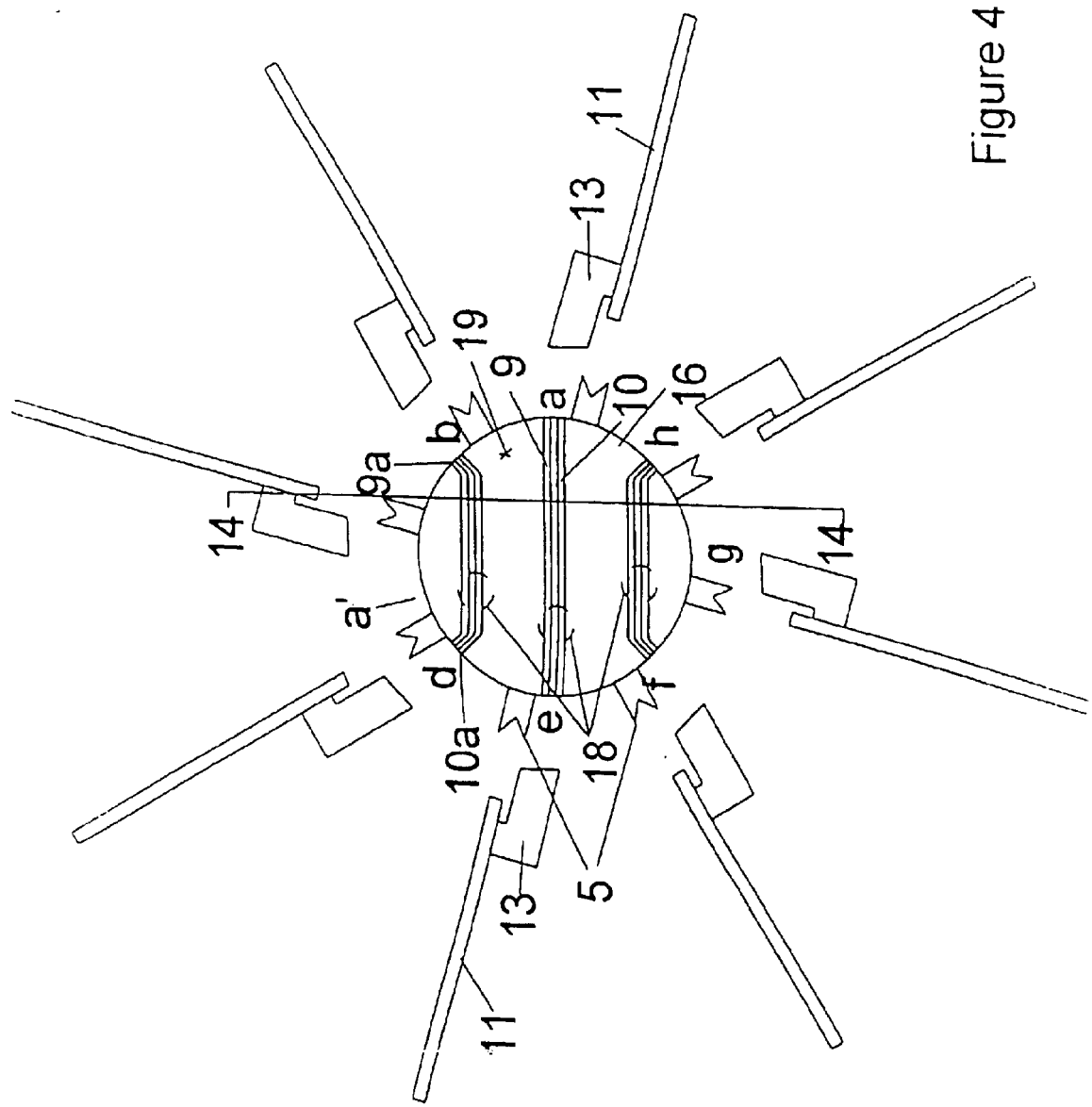
FIG. 4 is a plan view of a first of the optical waveguide plates forming part of the full mesh optical backplane according to the invention.
Figure 6:
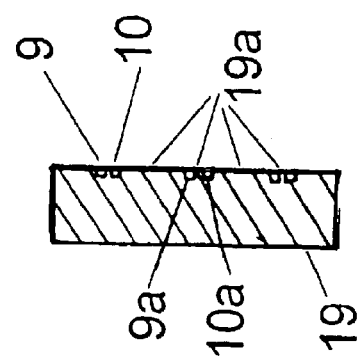
FIG. 6 is a section view taken along line 6—6 of FIG. 4.
Figure 5:
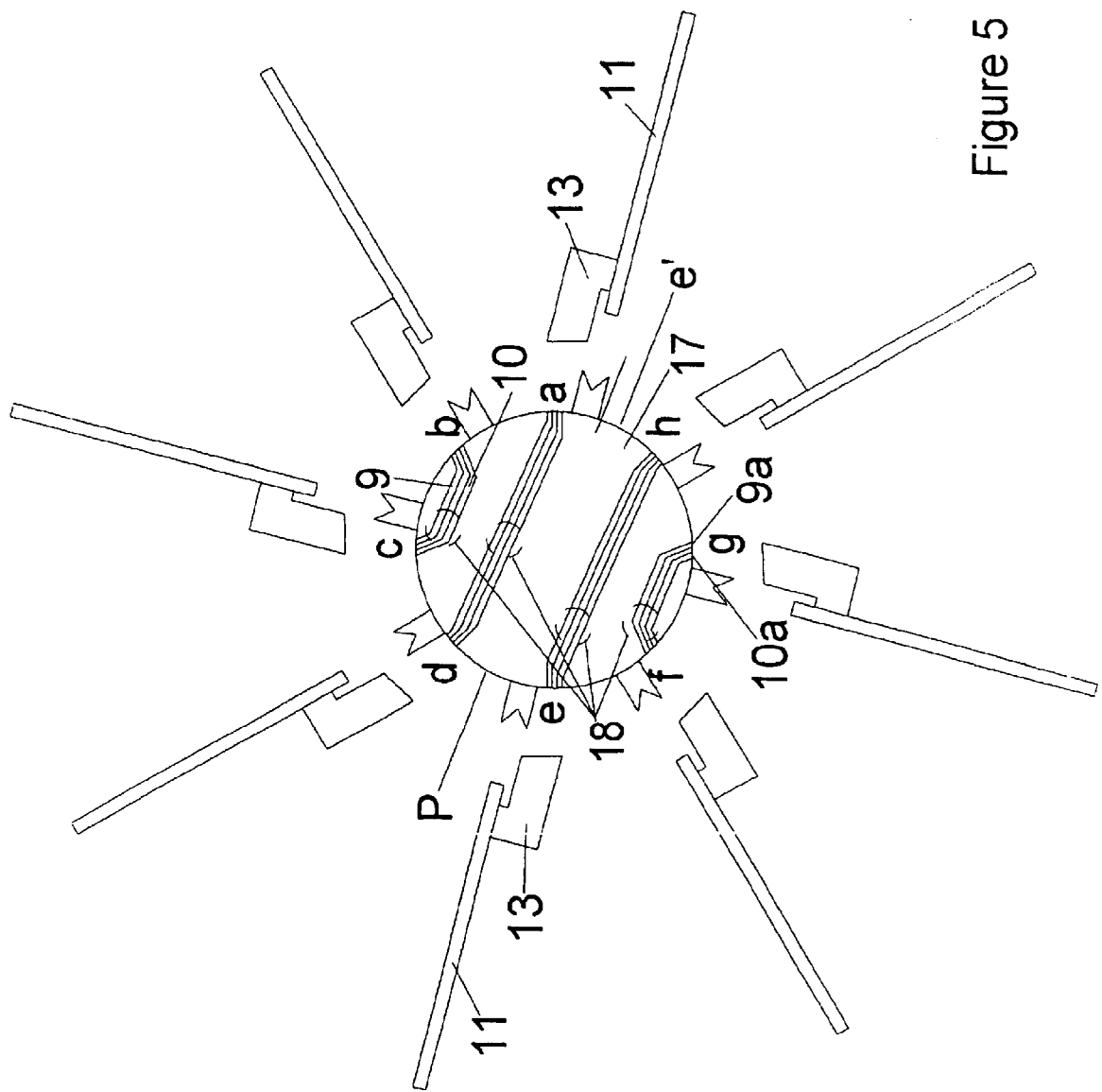
FIG. 5 is a plan view of a second of the optical waveguide plates forming part of the full mesh optical backplane according to the invention.

FIGS. 4 and 5 respectively illustrate first and second types of waveguide plates. The waveguide plate 16 of FIG. 4 is an opaque optical body 19 with three pairs 20 of optically transparent side-by-side waveguides, with each waveguide pair comprising a receiving waveguide 9 in optical registry with electro-optical interface 13 receiving port 9a (FIG. 7) and a transmitting waveguide 10 in optical registry with electro-optical interface 13 transmitting port 10a. The optically opaque body at 19a (FIG. 6) also extends between the side-by-side transmitting waveguide 10 and the receiving waveguide 9 so that the two waveguide members of the pair are optically isolated from each other. FIG. 6 shows a cross section of the waveguide plate of FIG. 4 with the transmitting waveguide 10 and the receiving waveguide shown to extend only partially into the optically opaque body 19. The diminutive sizes of the transmitting 10 and receiving 9 waveguides is intended to maximize the density of the optical flux within each waveguide.

FIG. 7 of the drawing illustrates the mating surfaces for the transmitting 10 and receiving 9 waveguides. Recesses are formed to provide positive locating means for the electro-optical interface 13. These mating structures also allow for the abutment of another set of waveguides that may extend the optical path directly onto the circuit board assembly 11. A dividing wall 24 prevents light from the transmitting waveguide 10 from entering the receiving waveguide 9.

The second type of waveguide plate 17 is shown in FIG. 5 in which four pairs of optical waveguides are provided. Each pair of optical waveguides comprises both a transmitting waveguide 10 and a receiving 9 waveguide in side-by-side relationship and optically isolated from each other along their entire lengths, and optically isolated from each other at waveguide ports 9a and 10a at the perimeter P of the plate 17.

The first and second waveguide plates of FIGS. 4 and 5 are circles of the same diameter with cardguide stations a–h equally spaced about the circumference of the plates. With eight circuit board assemblies the spacing is 45° between adjacent stations. This arrangement provides minimal optical path length, and in consequence, minimizes transmission delays in the optical signals. In three-pair waveguide plate a' of FIG. 4, the three waveguides are parallel to each other, one waveguide of the three is diametrical between stations a–e, two are chords of the circle b–d, f–h, and the remaining diametrically opposed stations c–g are left blank. This basic waveguide pattern shifts 45° with respect to fixed circuit board assembly stations a–h as the pattern is applied to plates b', c', and d' seen in FIGS. 1 and 8.

In the four waveguide plates e'–h' (FIGS. 1, 5, and 8), four parallel waveguides define chords of the circle between fixed circuit board assembly stations a–h spaced apart 45° on each plate. The connectivity pattern shifts 45° as it is applied to plates e', f', g', and h'.

In FIG. 4, the radially installed circuit board assemblies are indicated by numeral 18.

Figure 8:
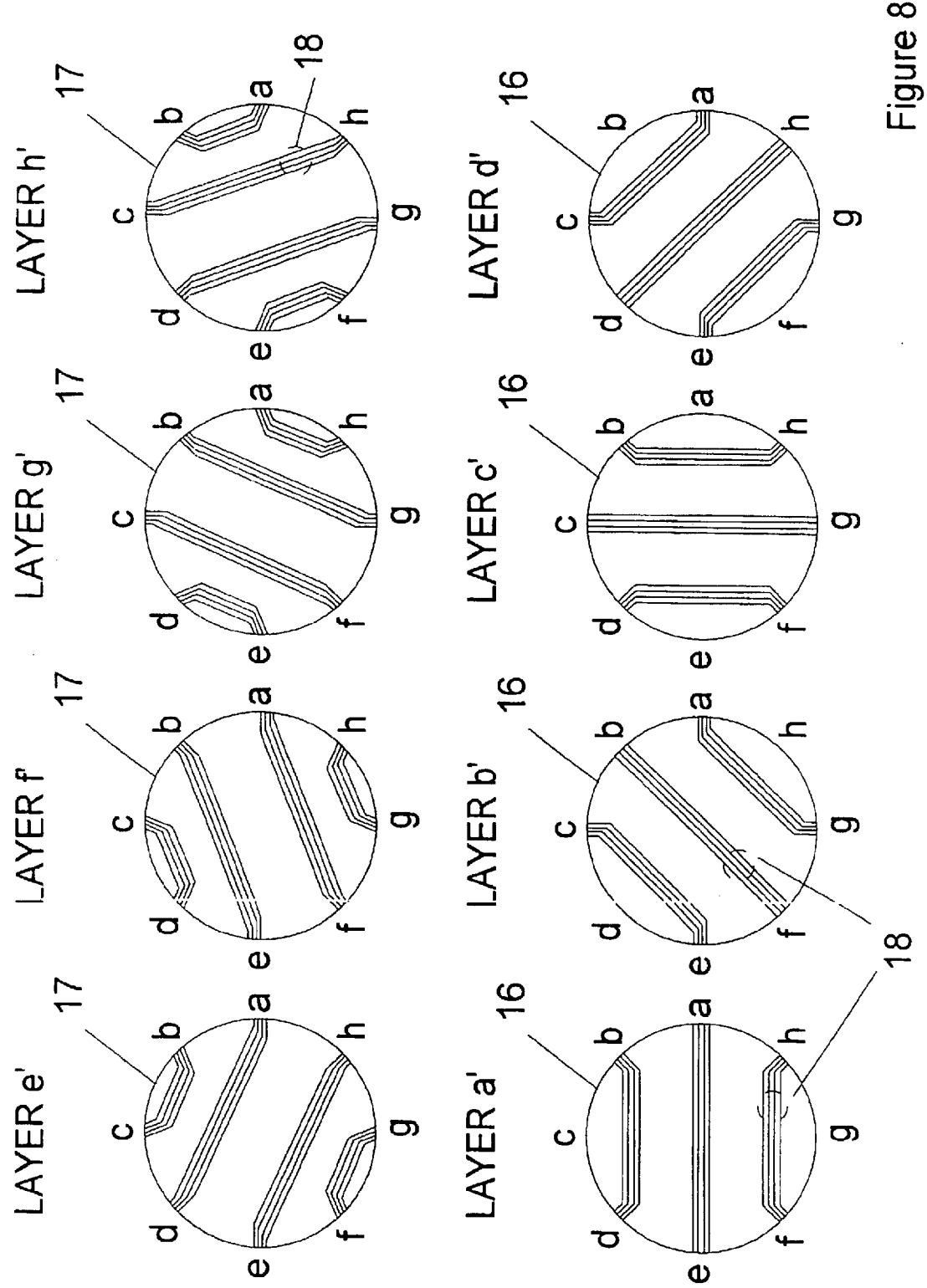
FIG. 8 is a plan view showing the orientations of four copies each of the first and second optical waveguide plates of FIGS. 4 and 5 prior to assembly in the stacked arrangement of FIG. 1, with individual plates or layers marked according to the table of FIG. 3.

FIG. 8 illustrates the set of four three-pair waveguide plates 16 referred to specifically to as plate or layer a' through layer d', and a set of four four-pair waveguide plates 17 identified as layer e' through h'. The waveguide plates 16 and 17 of FIG. 8 contain the requisite twenty-eight waveguide pairs 18 for the preferred embodiment. The plate identification letters also appear in sequence a'–h' in the optical waveguide stack of FIG. 1. Each wave guide plate 16 and 17 in FIG. 8 is circumscribed with cardguide or station letters a through h to indicate particular cardguide stations with respect to each plate and cardguide stations with respect to each transmit/receive waveguide pair. It will be further observed in FIG. 8 that waveguide plates a'–d' and e'–h' are rotated with respect to each other and assume four different angular positions. In the preferred embodiment of FIG. 8 the plate to plate angular separation is 45°. It is to be seen then, that the circuit board assembly 11 in FIG. 2 for card guide a has no electro-optical interface 13 at the position of layer c' because, as shown for layer c' in FIG. 8, there is no optical waveguide terminus for cardguide at the position of layer c'. For the same reason, the circuit board assembly e for layer c' omits an electro-optical interface 13 at layer c', and so forth for layers a', b', and d'.

Those skilled in the art recognize that there are several methods of construction to achieve the desired configuration of waveguide plate. For example, the optically opaque body can be machined to form slots for the transparent waveguide pairs 18. The waveguide pairs also can be machined to fit. The optically opaque body 19 can be injection molded leaving voids where the waveguide pairs are to reside with a secondary molding operation with optically transparent material used to form the waveguide pairs 18.

A table showing a matrix of interconnections for the electro-optical interfaces of eight circuit board assemblies a–h and waveguide terminuses for waveguide plates a'–h' is shown in FIG. 3. For example, the circuit board assembly installed at optical backplane station d has electro-optical interfaces in optical registry with the waveguide receive ports 9a and transmit ports 10a of waveguide plates or layers e', a', f', g', c', h', and d'. The diagonal of the table shows that it is not necessary to connect a circuit board assembly to itself through an optical backplane. The table also shows the orthogonal nature of the interconnection scheme where the matrix portions above and below the diagonal are mirror images. This orthogonal symmetry represents the paired nature of the interconnect for optical transmission and reception.

Figure 9:
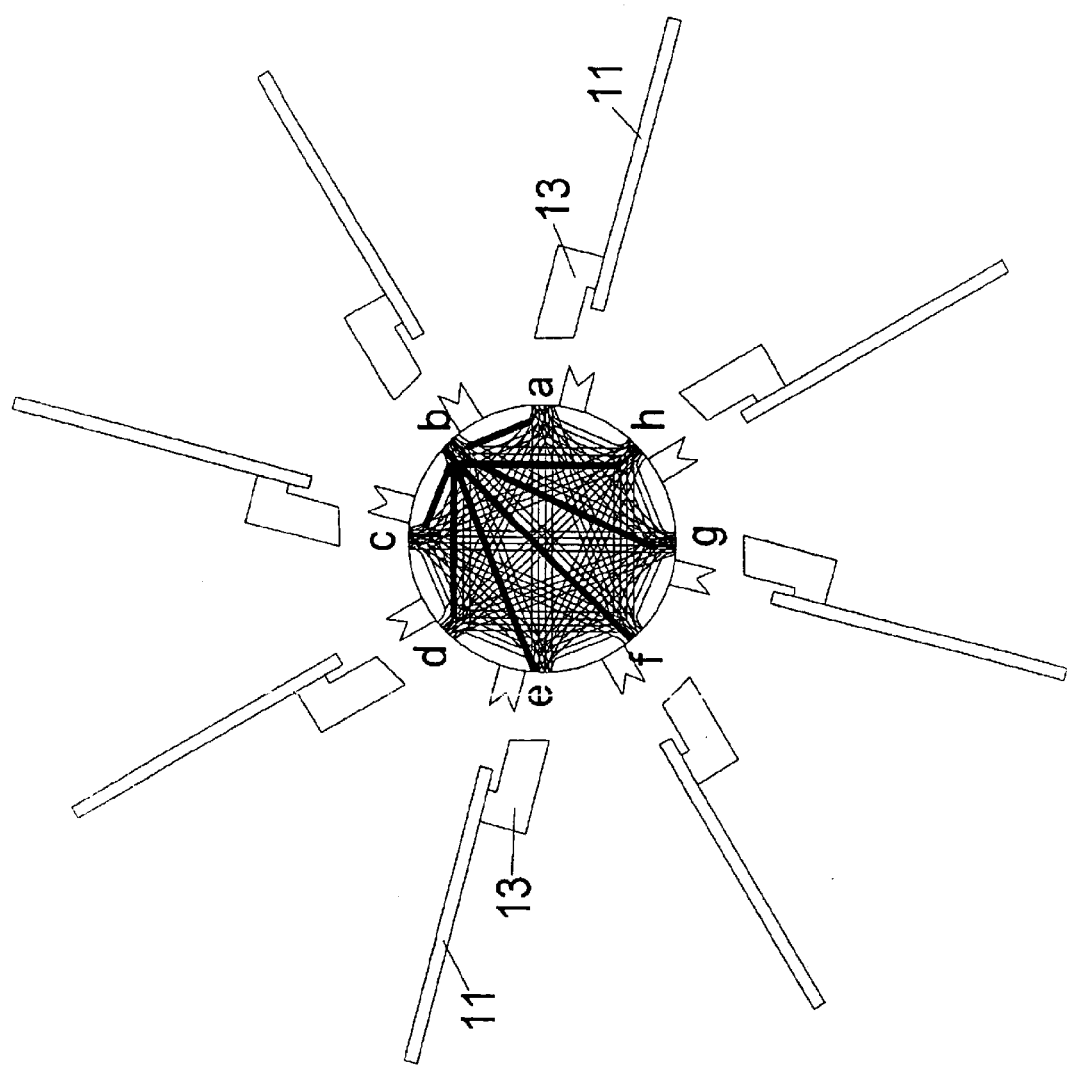
FIG. 9 is a transparent plan view showing the resulting optical connectivity, enabled by stacked optical waveguide plates, between all circuit board assemblies arranged radially about the full mesh optical backplane according to the preferred embodiment of the invention.

FIG. 9 of the drawing depicts a transparent end-on view of the vertically stacked full mesh backplane of the preferred embodiment circumscribed with letters representing the same cardguide stations of FIGS. 1 and 8. The twenty-eight pairs of optical waveguides are superimposed to illustrate in FIG. 9 that each circuit board assembly a–h is connected to every other circuit board assembly for optical transmission and reception through a particular pair of optical waveguides.

Figure 10:
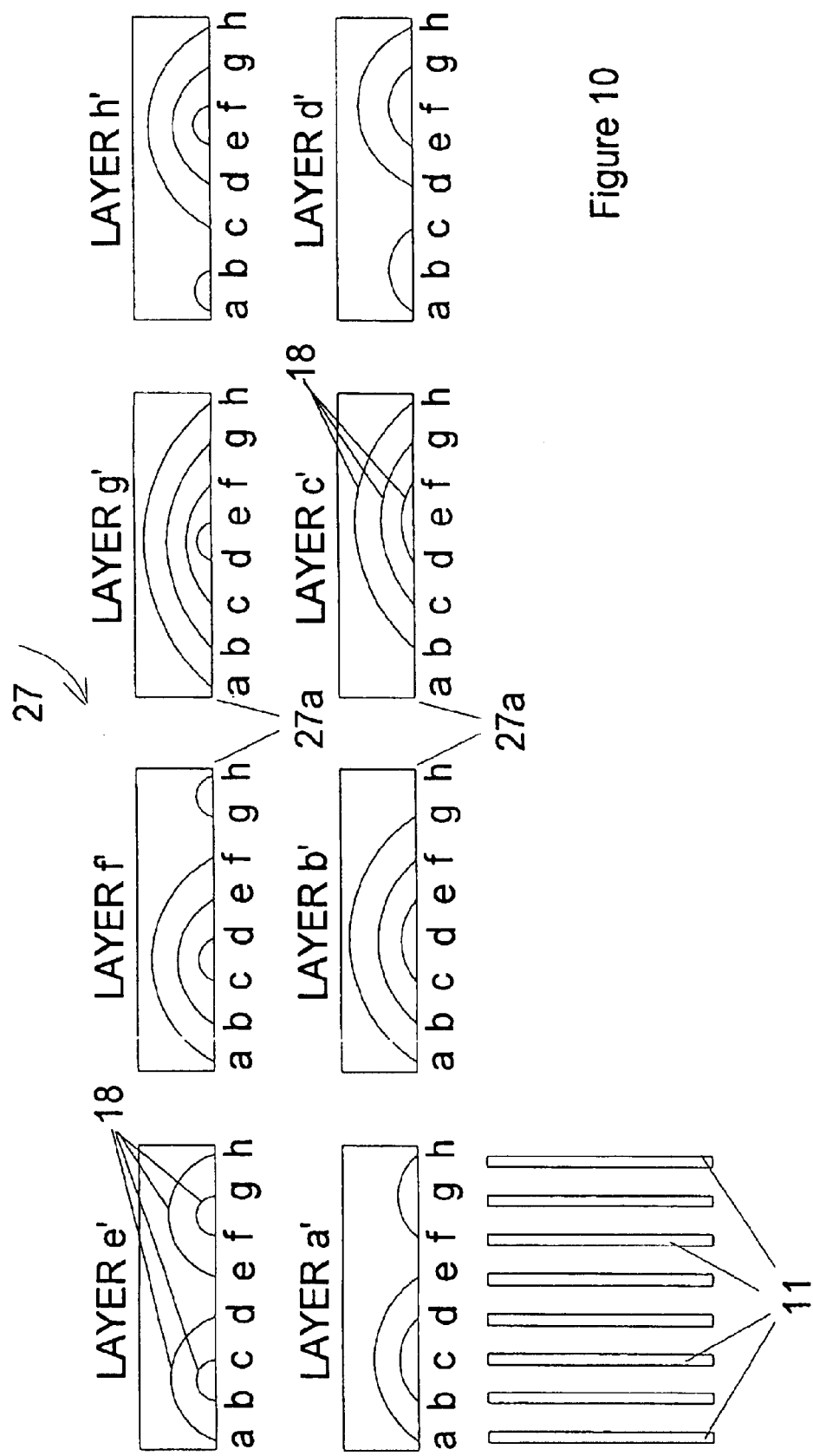
FIG. 10 is a schematic illustration of a modified embodiment of the invention utilising rectangular optical waveguide plates.

FIG. 10 illustrates a modified embodiment of the invention in the form a set of waveguide plates 27 for a rectilinear full mesh optical backplane. The rectangular waveguide plates identified as layers a' through h' include a first set of four three-pair wave guide plates (layers a'–d') and a second set of four four-pair plates (layers e'–h') with waveguide pairs 1–5, 2–4, and so forth extending from a common edge 27a of each plate. The principles specified in the preferred embodiment for power distribution, location of circuit board assemblies, positioning of electro-optical interfaces, optical isolation of transmit/receive waveguide pairs, and connectivity apply, mutatis mutandi, to the embodiment of FIG. 10. In each waveguide plate the circuit board assembly stations 1–8 are equally spaced on a straight edge 27a and the four three-waveguide plates as well as the four four-waveguide plates have waveguide arcs connecting the several stations such that when the plates are stacked with stations 1–8 aligned and assembled with circuit boards to form a communications system, each circuit board communicates with every other circuit board in they system.

In this alternate embodiment, a more ordinary system construction is allowed in which the circuit board assemblies are installed parallel to each other as opposed to installation in a circular array.

Figure 11:
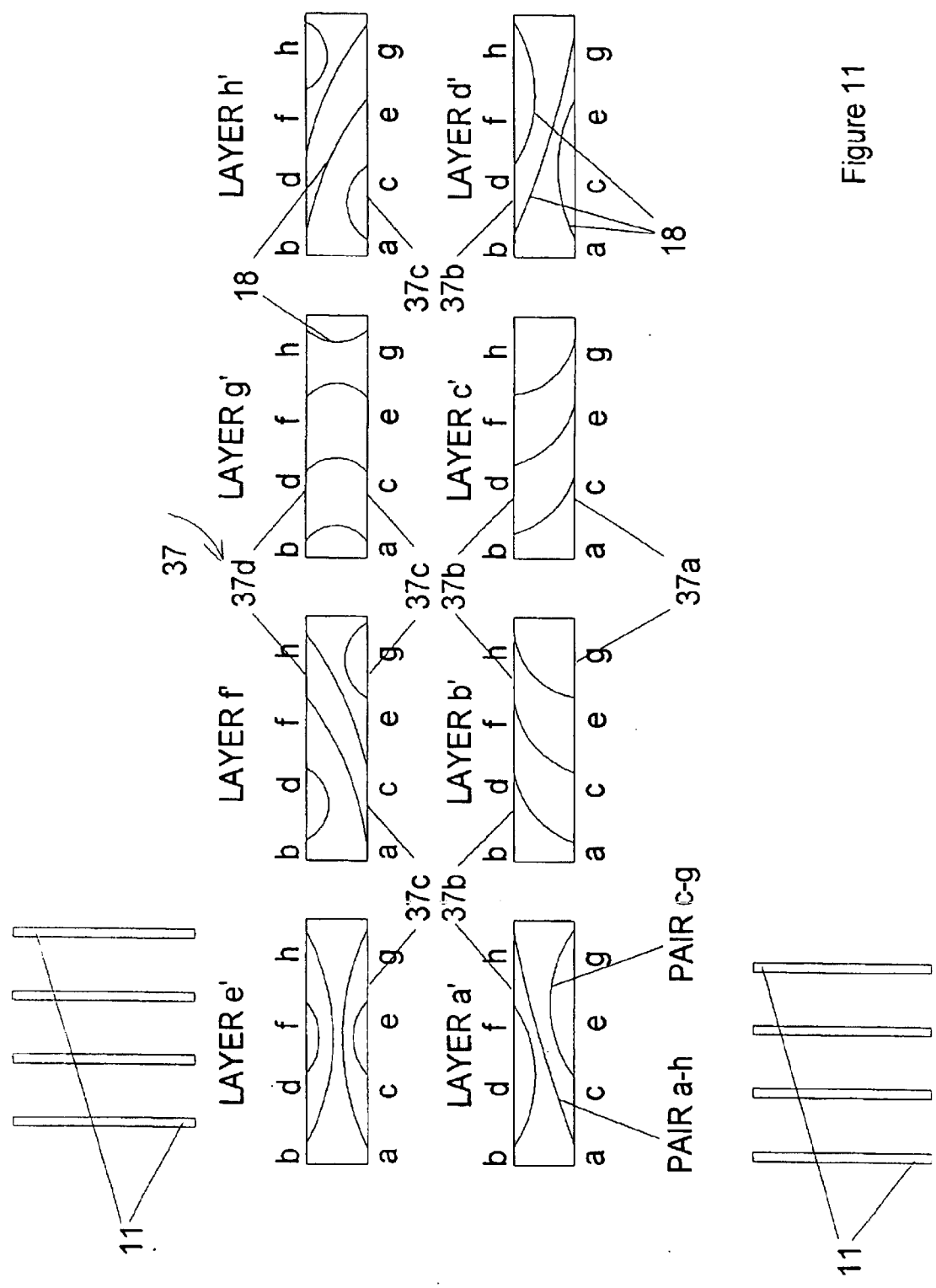
FIG. 11 is a plan view of an full mesh optical interconnect in the form of a midplane.

FIG. 11 illustrates another embodiment of the invention. The invention has thus far been described as an optical backplane. The set 37 of waveguide plates of FIG. 11 are used to construct an interconnect device sometimes referred to as a midplane which is a backplane with circuit board assemblies connected to both sides. Midplanes are found in systems where it is undesireable to change a cabling installation once it has been completed.

FIG. 11 illustrates a set of four three-pair waveguide plates referred to specifically to as plate or layer a' through layer d', and a set of four four-pair waveguide plates identified as layer e' through h'. The waveguide plates of FIG. 11 contain the requisite twenty-eight waveguide pairs for this midplane embodiment. Each waveguide plate in FIG. 11 is circumscribed with cardguide or station letters 1 through 8 to indicate particular cardguide stations with respect to each plate and cardguide stations with respect to each transmit/receive waveguide pair. It will be further observed in FIG. 11 that waveguide plates a'–d' and e'–h' are stacked with respect to each other and present two sides 37a–b and 37c–d for receiving circuit board assemblies.

The midplane of FIG. 11 is an improvement on an electrical midplane because there is no need to stagger the electrical connector locations as those skilled in the art recognize. Additionally, it is to be recognized that using additional waveguide plates carrying additional waveguides from the generally frontmost side to the generally rearmost side may be useful as a means of simple optical isolation from input/output circuitry which may be exposed to high voltages or high energy surges.

Figure 12:
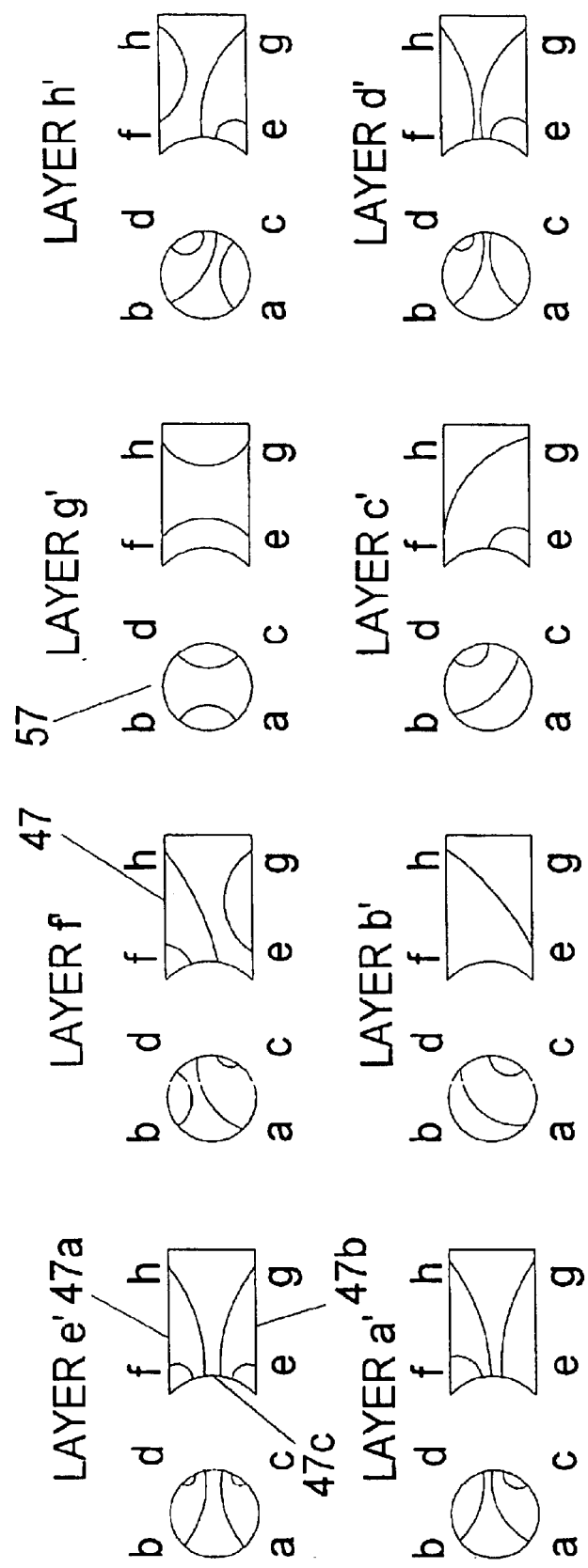
FIG. 12 is a plan view of a combined circular and rectilinear full mesh optical interconnect.

FIG. 12 shows in plan view a system utilizing an optical interconnection scheme comprising sections of rectilinear 47 and circular 57 midplanes. Such construction may be useful when high bandwidth circuit board assemblies need a short and fast communication path such as is provided by a circular midplane while other circuit board assemblies can use the generally longer communications paths provided by a rectilinear midplane wherein the overall system must reside in a typical rack-mounted enclosure.

In FIG. 12, the circular and rectangular sections of the midplane are connected simply by abutting some interconnecting waveguides between the two otherwise independent sections. The pairs of rectilinear 47 and circular 57 waveguide plates referred to specifically as plate or layer a' through layer d', and as layer e' through h'. The waveguide plates 47 and 57 contain the waveguide pairs for each of eight circuit board assemblies with this midplane illustrative embodiment having eight circuit board assemblies. Each wave guide plate 47 and 57 in FIG. 12 is circumscribed with cardguide or station letters 1 through 8 to indicate particular cardguide stations with respect to each plate and cardguide stations with respect to each transmit/receive waveguide pair, with a corresponding number of optically isolated transmitting and receiving waveguide paths. It will be further observed in FIG. 12 that waveguide plates a'–d' and e'–h' are stacked with respect to each other and present circular and rectilinear surfaces for receiving circuit board assemblies.

The rectilinear plates 47 are characterized by straight edges 47a–b joined by curvilinear edge 47c preferably being circular. The curvilinear plates 57 are preferably circular and abut corresponding edge 47c of plate 47. When nested, plate e' for example, provides communication paths in the form of waveguides 6–7, 5–8, 1–4, and 2–3.

Those skilled in the art will see that any connectivity can be established for any number of circuit board assemblies by taking advantage of the present invention.

The present invention lends itself very well to the notions of redundancy and fault tolerance. Since it is contemplated that the waveguide plates or layers are relatively thin, the height of an optical interconnect for a given number of circuit board assemblies would be rather small. Consequently, a redundant backplane can easily be made to fit in most systems so that an additional set of communications paths is always readily available should a component associated with one or more of those in use fail. Alternatively, the additional communications paths can be used to handle any additional bandwidth should a given system require it. This additional bandwidth may come from the mere addition of communications paths or it may come from the construction of a logical bus or wide data path between circuit board assemblies. An additional capability provided by such simple scaleability is that in some systems it is desirable to provide separation of the transmitter and the receive circuitry for ease of circuit board assembly layout and to minimize any interference that high power transmitters may introduce into high sensitivity receivers.

The waveguide plates 16, 17, 27, 37, 47 and 57 are described in detail above for transmitting and receiving optical signals in the optically isolated side-by-side waveguide paths. It is to be understood the the side-by-side waveguide paths are capable of conducting transmitting and transmitting optical signals as well as receiving and receiving optical signals.

Various changes may be made to the structure embodying the principles of the invention. The foregoing embodiments are set forth in an illustrative and not in a limiting sense. The scope of the invention is defined by the claims appended hereto.

We claim:

1. A full mesh optical backplane for an electronic system comprising a plurality of waveguide plates arranged in a stack, a plurality of circuit board assemblies mounted on the stack at spaced stations, power distribution means for each circuit board assembly, the stack of waveguide plates having a plurality of plates of side-by-side optically isolated transmitting and receiving waveguide paths passing through each plate, and the paths being optically accessible at spaced pairs of adjacent optically isolated receiving and transmitting ports at the stations on each plate, each circuit board having a plurality of electro-optical interfaces in optical registry with transmitting and receiving paths on the plates whereby each circuit board assembly communicates with every other circuit board assembly in the system by way of a full mesh of said dedicated optically isolated transmitting and receiving paths.

2. An optical backplane for an electronics system comprising a plurality of waveguide plates arranged in a stack, a plurality of circuit board assemblies mounted on the stack at spaced stations, power distribution means for each circuit board assembly, the stack of waveguide plates having a plurality of plates of side-by-side optically isolated transmitting and receiving waveguide paths passing through each plate, and the paths being optically accessible at spaced pairs of adjacent optically isolated receiving and transmitting ports at the stations on each plate, each circuit board having a plurality of electro-optical interfaces in optical registry with transmitting and receiving paths whereby each circuit board assembly communicates with every other circuit board assembly in the system.

3. An optical backplane as defined in claim 2 in which the waveguide plates are circular to minimize the length of optical paths and thereby to minimize transmission delays.

4. A waveguide plate for an optical backplane, the plate having a surface, the plate comprising at least one pair of side-by-side optically isolated transmitting and receiving waveguide paths passing through the plate with the optical paths being optically accessible at spaced pairs of adjacent optically isolated receiving and transmitting ports at the surface of the plate, the receiving and transmitting ports being recesses defining positive locating means for an electro-optical interface and for receiving another set of waveguides to extend the optical paths directly onto a circuit board assembly.

* * * * *